Nov. 10, 1959     A. LOGAN     2,912,100

DRIVE MECHANISM

Filed Nov. 25, 1955     3 Sheets-Sheet 1

INVENTOR.
A. LOGAN
BY
ATTORNEY

Nov. 10, 1959     A. LOGAN     2,912,100

DRIVE MECHANISM

Filed Nov. 25, 1955     3 Sheets-Sheet 3

INVENTOR.
A. LOGAN
BY
ATTORNEY

United States Patent Office 2,912,100
Patented Nov. 10, 1959

2,912,100

DRIVE MECHANISM

Alexander Logan, Indianapolis, Ind., assignor to Western Electric Company, Incorporated, New York, N.Y., a corporation of New York Application November 25, 1955, Serial No. 549,100

1 Claim. (Cl. 203—135)

This invention relates to drive mechanisms, and more particularly to quick-acting drive mechanisms.

Certain types of material feeding apparatus employ quick-acting drive mechanisms to achieve a rapid feed stroke during a relatively small portion of an operating cycle. One of the common means utilized to achieve such operation is a cam having a camming surface contoured to impart the required displacement to a cam follower during a relatively small angle of rotation of the cam. In some instances the magnitude of the required displacement of the cam follower is so great and the required feed stroke so rapid, that, unless the cam is made extremely large, the pressure angle of the cam during the feed stroke portion of its cycle becomes very large.

The pressure angle of a cam is the angle between the direction of travel of a reference point on the cam follower, and the normal to the pitch curve at the reference point. It is a measure of the side pressure on the cam follower and its bearings. Large pressure angles cause rough running and frequently cause excessive wear of the cam, the cam follower and its supporting bearings. In the design of cams the maximum pressure angle is a controlling factor and heretofore dictated the size of the cam necessary to meet the given requirements of the cam follower motion. Accordingly, it would be extremely advantageous if the maximum pressure angle for the given requirements could be reduced without resorting to a larger cam.

An object of this invention is to provide new and improved drive mechanisms.

Another object of this invention is to provide new and improved quick-acting drive mechanisms.

Apparatus illustrating certain features of the invention may include a movable cam having a camming surface, a cam-follower engaging the camming surface and movable thereby when the cam is moved, and means for moving the cam at a variable speed.

A complete understanding of the invention may be had from the following detailed description of the apparatus forming a specific embodiment thereof, when read in conjunction with the appended drawings, in which.

Figure 1:
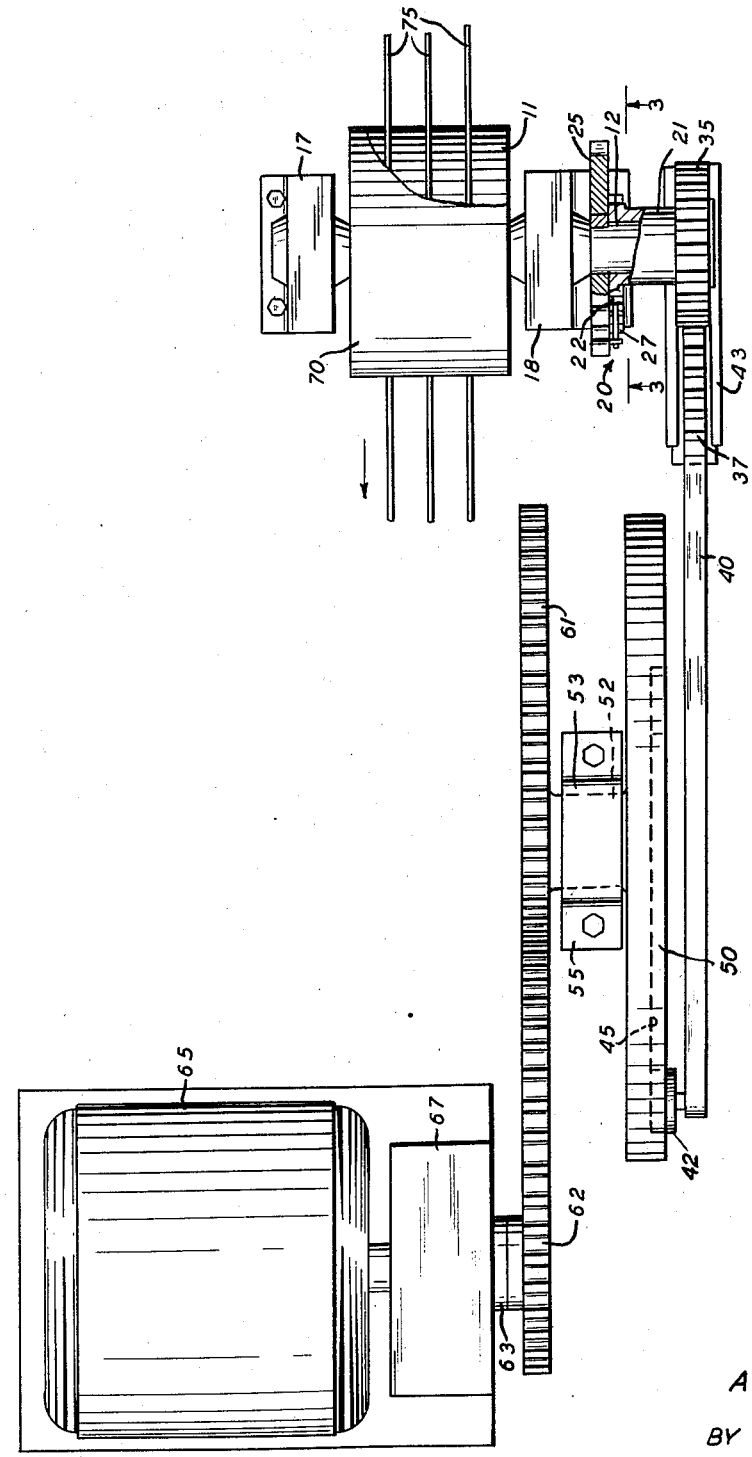
Fig. 1 is a top plan view of material feeding apparatus provided with a quick-acting feed mechanism forming a specific embodiment of the invention, with parts thereof broken away.
Figure 2:
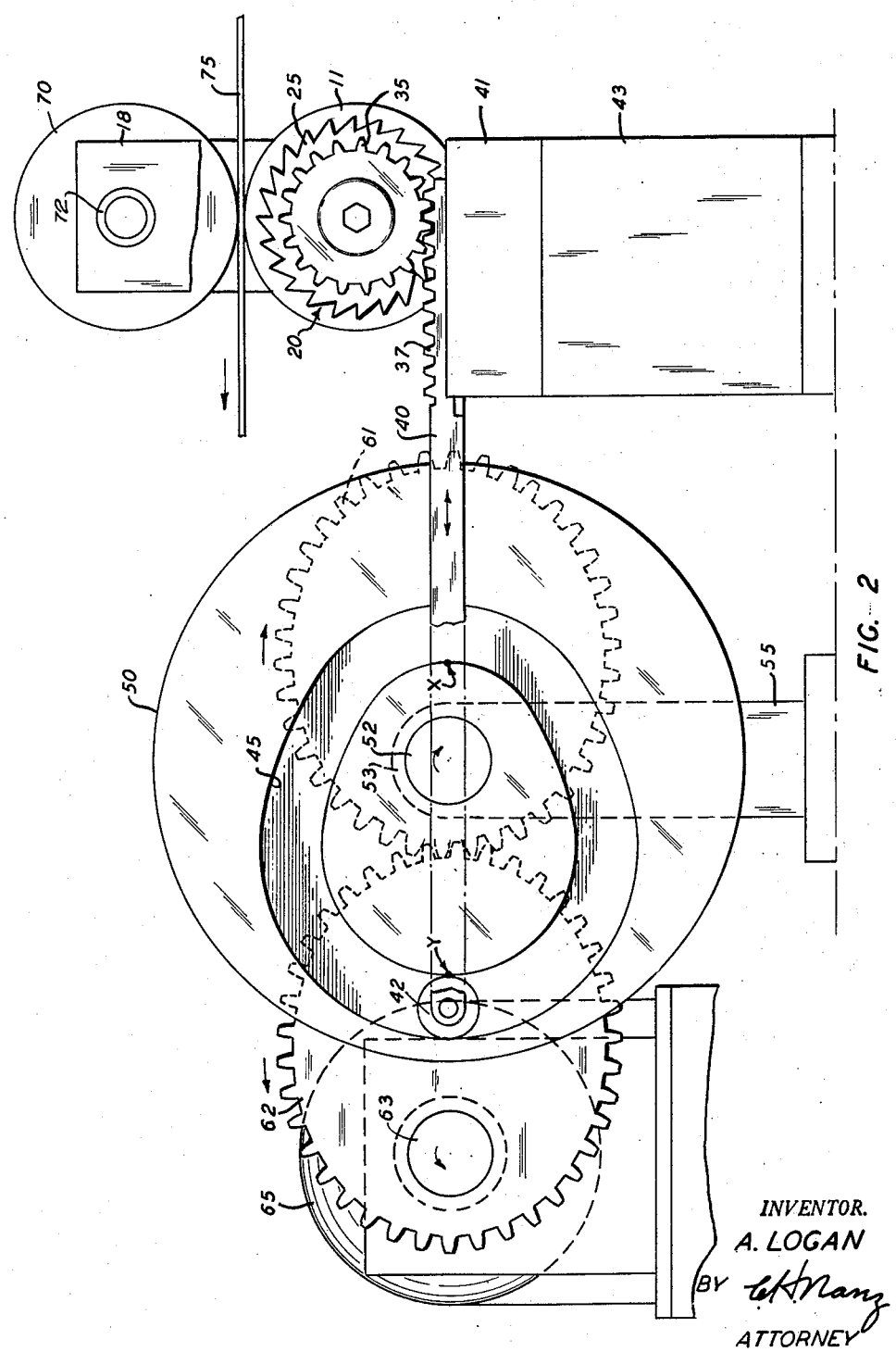
Fig. 2 is a side elevation of the apparatus shown in Fig. 1, with parts thereof broken away.

Referring to Figs. 1 and 2, there is shown a feed roller 11 keyed upon a horizontal, transversely extending shaft 12 for rotation therewith. The shaft 12 is mounted rotatably in suitable bearings on spaced, vertical supports 17 and 18.

Figure 3:
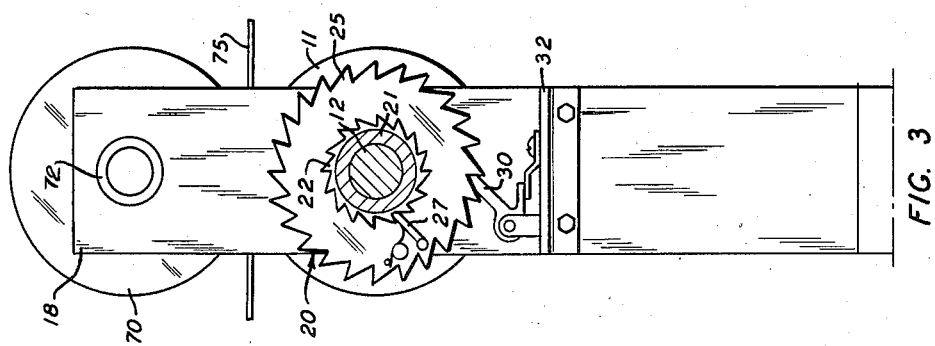
Fig. 3 is a fragmentary vertical section taken along line 3—3 of Fig. 1.

One end of the shaft 12 projects a short distance beyond the support 18 and is connected by means of a ratchet and pawl mechanism, indicated generally by the numeral 20, to a rotatable, hollow shaft 21 which is mounted coaxially thereon. The ratchet and pawl mechanism 20 includes a ratchet wheel 22 secured to the inner end of the hollow shaft 21 for rotational movement therewith relative to the shaft 12. The ratchet wheel 22 is positioned immediately adjacent to a larger ratchet wheel 25 which is mounted fixedly on the shaft 12. The periphery of the smaller ratchet wheel 22 cooperates with a pivoted, spring-biased pawl 27 (Fig. 3) mounted on the adjacent side of the larger ratchet wheel 25, as shown in Figs. 1 and 3. Similarly, the periphery of the larger ratchet wheel 25 cooperates with a pivoted, spring-biased pawl 30 mounted on a bracket 32 extending laterally from the support 18.

The pawl 27 is designed to engage the ratchet wheel 25 to the ratchet wheel 22 for rotation therewith, when the latter is rotated in a counterclockwise direction, as viewed in Fig. 2. The pawl 30 prevents the ratchet wheel 25 from rotating in a clockwise direction, while the pawl 27 disengages the ratchet wheel 25 from the ratchet wheel 22, when the latter is rotated in a clockwise direction.

The outer end of the hollow shaft 21 is provided with a pinion gear 35 mounted fixedly thereto for rotation therewith. The pinion gear 35 meshes with a toothed rack 37 formed on one end of a horizontally reciprocable cam-follower rod 40. The cam-follower rod 40 is supported slidably in a suitable bearing and guide member 41 mounted on a support 43.

It may be seen, that, when the rack 37 moves to the right, as viewed in Fig. 2, the pinion gear 35 is rotated counterclockwise and, in turn, rotates the hollow shaft 21 in the same direction about the shaft 12. Counterclockwise movement of the hollow shaft 21 rotates the smaller ratchet wheel 22 in a counterclockwise direction carrying with it the larger ratchet wheel 25 because of the locking engagement of the pawl 27. Thus, the feed roller 11 is driven in a counterclockwise direction whenever the cam-follower rod 40 moves to the right. However, when the cam-follower rod 40 moves to the left, as viewed in Fig. 2, and the pinion gear is rotated in a clockwise direction, the ratchet wheel 25 is locked by the pawl 30 and, thus, the feed roller 11 remains stationary. The leftward movement of the cam-follower rod 40 only effects a clockwise angular movement of the ratchet wheel 22 relative to the then stationary ratchet wheel 25, to cock the ratchet and pawl mechanism 20 preparatory to the next subsequent feed stroke.

The cam-follower rod 40 is provided at its left hand end with a cam-follower roller 42 which is engaged rollingly in a cam slot 45 formed in the adjacent face of a circular cam 50. The cam 50 is mounted centrally on one end of a horizontal, transversely extending stub shaft 52 which is mounted rotatably in a bearing 53 positioned on a vertical support 55. Keyed to the opposite end of the stub shaft 52 is an elliptical gear 61 which intermeshes with and is driven by a mating elliptical gear 62. The elliptical gear 62 is driven at a constant predetermined angular speed by a driver shaft 63 operatively connected to a constant speed electric motor 65 through a gear reduction unit 67.

Cooperating with the feed roller 11 is a pressure roller 70 which is mounted rotatably on a shaft 72 journaled in the supports 17 and 18 directly above the feed roller. The pressure roller 70 cooperates with the feed roller 11 to cause the latter to frictionally grip a plurality of spaced, generally parallel, wires 75—75 positioned between the pressure roller and the feed roller. A predetermined rotational movement of the feed roller 11 in a counterclockwise direction, as viewed in Fig. 1, serves to feed the leading ends of the wires which are frictionally gripped by the feed roller, a predetermined distance to the left. The wires 75—75 are of indefinite lengths and are withdrawn from individual supplies thereof (not shown).

Figure 4:
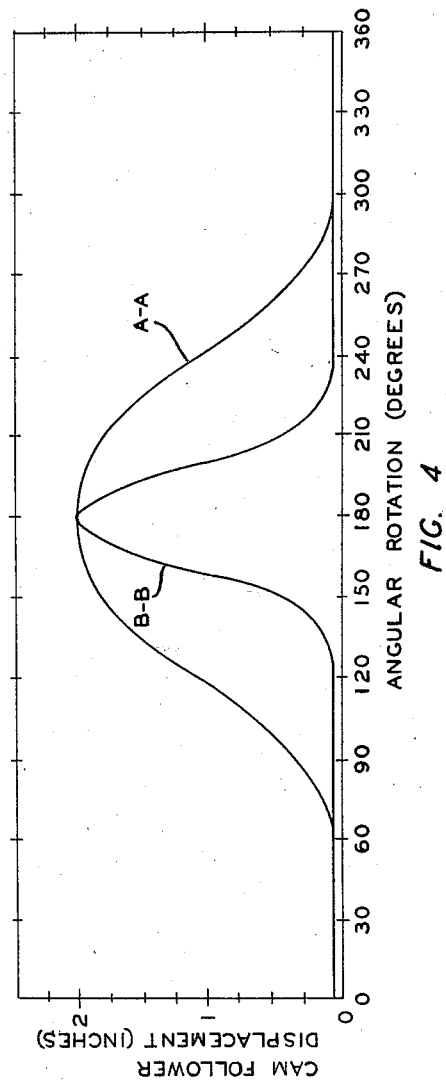
Fig. 4 is a chart illustrating graphically certain operating characteristics of the feed mechanism.

Referring again to Fig. 2, it may be seen that the cam slot 45 of the cam 50 is provided with a relatively smooth and gently curved contour which causes a minimum displacement of the cam-follower roller 42 at a reference point X, representing the starting position, and a maximum displacement at a point Y located 180° from the reference point X. The contour of the cam slot 45 is illustrated graphically by the curve designated A—A in Fig. 4, and it may be seen that the cam slot has a relatively smooth and gently curved contour with no abrupt changes in direction. As shown in Fig. 4, the rise in the cam slot 45 begins at a point 60° from the reference point X, reaches a maximum at the point Y (180°) and falls to the minimum displacement at a point 300° from the reference point X.

The elliptical gears 61 and 62 are designed to rotate the cam 50 unidirectionally at a cyclically varying rate, such that the rotational speed of the cam is a minimum when the displacement of the cam-follower roller is a minimum (i.e. when the cam is rotated 180° from the position as shown in Fig. 2) and a maximum when the displacement of the cam-follower roller 42 is a maximum (i.e. when the cam is in the position in which it is shown in Fig. 2). As a result, the period during which the cam-follower rod moves from the right, to its maximum displacement, as shown in Fig. 2, and then returns to the right, consumes a relatively shorter portion of the complete 360° cycle of the driver shaft than it would have had the cam 50 been driven at a uniform rate. The displacement of the cam-follower roller as a function of the angular rotation of the driver shaft is shown graphically by the curve B—B in Fig. 4.

*Operation*

During the operation of the apparatus hereinabove described, the motor 65 is energized to operate the driver shaft 63 rotationally at a predetermined, relatively slow, constant speed in the direction indicated by the arrow in Fig. 2. The driver shaft 63, in turn, drives the elliptical gear 62 at the same constant angular speed. However, the stub shaft 52, which is driven from the elliptical gear 62 by its mating elliptical gear 61, is rotated at a cyclically varying angular speed. Although the stub shaft 52 makes one complete revolution for each complete revolution of the drive shaft 63, the stub shaft operates during one portion of the cycle at a higher angular speed than the driver shaft and at another portion of the cycle at a lower angular speed than the driver shaft.

As described hereinabove, the maximum speed of the stub shaft 52 occurs when the cam 50 is in the position shown in Fig. 2. The minimum speed of the stub shaft 52 occurs when the cam 50 has rotated through 180° from that position so that the point X is immediately adjacent to the cam-follower roller. Thus the inactive portion of the complete cycle (i.e. one complete revolution of the driver shaft 63), during which there is no displacement of the cam-follower rod 40 from a position 180° from that in which it is shown in Fig. 2, is much greater than the remaining active portion of the cycle during which the cam-follower rod 40 moves to the left to the position shown in Fig. 2 and then returns to the right.

Referring now to the curve B—B in Fig. 4, it may be seen that the active portion of the cycle begins when the driver shaft 63 has rotated through 120° from its starting position and ends at a point 240° from its starting position. Hence, the active portion of the cycle spans 120° or one-third of the complete cycle of the driver shaft 63, whereas the inactive portion of the cycle spans the remaining 240° or two-thirds of the cycle.

The feed stroke is accomplished during the second half of the active portion of the cycle, that is, between 180° and 240° of the 360° cycle of the driver shaft 63. During the feed stroke the cam-follower rod 40 moves rapidly to the right, from the position shown in Fig. 2, to rotate the pinion gear 35, which meshes with the rack 37, in a counterclockwise direction through a predetermined angular rotation. The counterclockwise rotation of the pinion gear 35, in turn, rotates the feed roller 11 in the same direction by the same amount whereby the wires 75—75, which are frictionally gripped thereby, are fed longitudinally a predetermined distance to the left. It may be seen that the feed stroke is relatively rapid and consumes only one-sixth of the complete 360° cycle of the driver shaft 63.

The rapid leftward stroke of the cam-follower rod 40 to its position of maximum displacement, as shown in Fig. 2, rotates the pinion gear 35 in a clockwise direction to cock the pawl and ratchet mechanism 20 preparatory for the next feed stroke which will occur during the next subsequent 60° rotation of the driver shaft 63. As soon as the cam-follower rod 40 reaches its maximum displacement at 180° from the start of the 360° cycle of the driver shaft 63, as it reaches the position shown in Fig. 2, it is moved rapidly to its starting position during the next 60° of the cycle. Thus, it may be seen that a rapid feed stroke has been achieved, which consumes only one-sixth of the complete 360° cycle of the driver shaft 63, without resorting to a larger cam or cam having a cam slot with relatively abruptly changing contour.

If the cam 50 were driven directly by the driver shaft 63 at a constant rotational speed, it is apparent that the cam slot would have had to have a very abruptly changing contour to give the desired movement to the cam-follower rod 40. It is manifest that the maximum pressure angle in the case of an abruptly contoured cam slot would be much greater than the maximum pressure angle now encountered in the cam 50, as shown in Fig. 2. In fact the abrupt changes in the contour of a cam driven at a constant speed would be so severe that it is doubtful whether it could be used without causing excessive and intolerable wear and damage to the cam, the cam-follower roller, the cam-follower rod and its bearings.

Manifestly, the invention is not limited to the hereinabove described exemplary embodiment thereof. It is obvious that numerous other modifications and embodiments of the invention may be constructed within the spirit and scope of the invention.

I claim:

A quick-acting feed mechanism, which comprises a pair of spaced vertical supports, a pair of spaced bearings secured to said supports, a horizontal shaft mounted rotatably in said bearings with a free end projecting outwardly beyond one of the bearings, a rotatable feed roll supported by and secured to said shaft between said bearings for advancing material of indefinite length frictionally engaged thereby, a hollow member mounted on the free end of said shaft for relative rotation with respect thereto, a first ratchet wheel secured to the inner end of said hollow member for rotation therewith, a second ratchet wheel secured fixedly to said shaft for rotational movement therewith, a spring-biased pawl secured pivotably to said second ratchet wheel with a free end thereof in engagement with the outer periphery of said first ratchet wheel, a second spring-biased pawl secured pivotably to one of said supports with a free end thereof in engagement with the outer periphery of said second ratchet wheel, a pinion gear mounted on said shaft coaxially with respect to said feed roll and secured to the outer end of said hollow member, a rack gear mounted slidably for reciprocation substantially parallel to the longitudinal axis of the material being fed and in meshing engagement with said pinion gear, a rotatable cam mounted eccentrically with respect to the feed roller and having a camming surface formed by a groove in one face thereof, a cam follower mounted rotatably and slidably in the groove in said cam and secured adjacent to one end of said rack gear, said camming surface being contoured to impart reciprocating movement to said cam follower during one portion of a complete revolution of said cam while maintaining said cam follower stationary during the remaining portion of the revolution whereby the reciprocating movement of said cam follower in one direction operates said ratchets and said pawls to give unidirectional rotation to said feed roll for advancing the material intermittently, an elliptical gear connected operatively to said cam for rotation therewith, a mating elliptical gear intermeshing with said first mentioned elliptical gear for driving the cam, means for driving said second mentioned elliptical gear at a substantially constant rotational speed and thus driving said cam through one complete revolution for each complete revolution of said second mentioned elliptical gear whereby the speed of said cam varies cyclically during each complete revolution thereof in a manner such that the rotational speed of said cam is at a maximum during that portion of the complete revolution of said cam in which movement is imparted to said cam follower to operate said feed roll so as to advance the material.

References Cited in the file of this patent

UNITED STATES PATENTS

| | | |
|---|---|---|
| 492,574 | Dayton | Feb. 28, 1893 |
| 914,668 | Olsson | Mar. 9, 1909 |
| 1,093,578 | Sommer | Apr. 14, 1914 |
| 1,142,059 | Saatweber | June 8, 1915 |
| 2,482,811 | Traumuller | Sept. 27, 1949 |
| 2,700,285 | Bellini | Jan. 25, 1955 |

OTHER REFERENCES

"Product Engineering": Principles of Design for Non-Circular Gears, 3 parts: Part I, December 1936, p. 455FF; II, January 1937, p. 19FF; III, February 1937, p. 63FF; (parts II and III particularly).